(12) United States Patent
Rosenbaum et al.

(10) Patent No.: US 8,060,412 B2
(45) Date of Patent: Nov. 15, 2011

(54) SYSTEM AND METHOD FOR OBTAINING MERCHANDISE INFORMATION

(75) Inventors: Walter Steven Rosenbaum, Paris (FR); Nathaniel E. Rosenbaum, Paris (FR)

(73) Assignee: Walter Steven Rosenbaum, Paris (FR)

( * ) Notice: Subject to any disclaimer, the term of this patent is extended or adjusted under 35 U.S.C. 154(b) by 1095 days.

(21) Appl. No.: 11/740,261

(22) Filed: Apr. 25, 2007

(65) Prior Publication Data

US 2008/0270249 A1    Oct. 30, 2008

(51) Int. Cl.
*G06Q 30/00* (2006.01)
(52) U.S. Cl. ............... 705/26.1; 705/14.23; 705/14.25; 705/14.39; 704/244; 704/257; 704/275
(58) Field of Classification Search ............ 705/14.23, 705/14.25, 14.36, 26.1; 704/244, 257, 275
See application file for complete search history.

(56) References Cited

U.S. PATENT DOCUMENTS

| | | | |
|---|---|---|---|
| 6,377,927 B1 * | 4/2002 | Loghmani et al. | 704/275 |
| 6,928,343 B2 | 8/2005 | Cato | |
| 2002/0026380 A1 | 2/2002 | Su | |
| 2002/0069131 A1 * | 6/2002 | Miyata et al. | 705/26 |
| 2002/0178013 A1 | 11/2002 | Hoffman et al. | |
| 2003/0125869 A1 | 7/2003 | Adams, Jr. | |
| 2005/0044011 A1 | 2/2005 | Deal | |
| 2006/0059049 A1 | 3/2006 | Morris et al. | |
| 2006/0163349 A1 * | 7/2006 | Neugebauer | 235/383 |
| 2007/0008068 A1 | 1/2007 | Brice et al. | |
| 2007/0179843 A1 * | 8/2007 | Eichenbaum et al. | 705/14 |
| 2008/0159495 A1 * | 7/2008 | Dahan | 379/93.01 |
| 2011/0137652 A1 * | 6/2011 | Blanchard et al. | 704/244 |

FOREIGN PATENT DOCUMENTS

| | | |
|---|---|---|
| DE | 10020544 A1 | 10/2001 |
| WO | 9930257 A1 | 6/1999 |
| WO | 02098107 A2 | 12/2002 |

OTHER PUBLICATIONS

"5 Questions for Alex Muller," Revenue Magazine, Jan. 10, 2007, Reprint downloaded on Aug. 29, 2007, 2 pages.
Bob Tedeschi, "A Richer Trip to the Mall, Guided by Text Messages," E-Commerce Report, Mar. 5, 2007, The New York Times, Reprint Downloaded on Aug. 29, 2007, 3 pages.
Don Clark, "Google Targets Voice Searches," Wall Street Journal, Apr. 12, 2007, p. B3, Reprint downloaded on Aug. 29, 2007, 2 pages.
International Searching Authority (EPO), "Notification of Transmittal of the International Search Report and the Written Opinion of the International Searching Authority, or the Declaration," Oct. 30, 2008, 18 pages.
Paraf, Edouard, Authorized Officer of the International Preliminary Examining Authority (EPO), "PCT International Preliminary Report on Patentability (Chapter II of the Patent Cooperation Treaty)," Aug. 19, 2009, 9 pages.

* cited by examiner

*Primary Examiner* — Yogesh C Garg
(74) *Attorney, Agent, or Firm* — Jerry Turner Sewell

(57) ABSTRACT

In a method of obtaining merchandise information from a store system using speech processing technology to determine a spoken query entry, an information inquiry from a customer regarding a particular product is received via a communication network. The location of the customer is determined, which is then used to determine a store closest to the customer. A merchandise database is searched for the inquired information regarding the particular product, wherein searching the merchandise database is limited to products available at the store closest to the customer location. The inquired information is retrieved from the merchandise database, and transmitted to the customer.

15 Claims, 3 Drawing Sheets

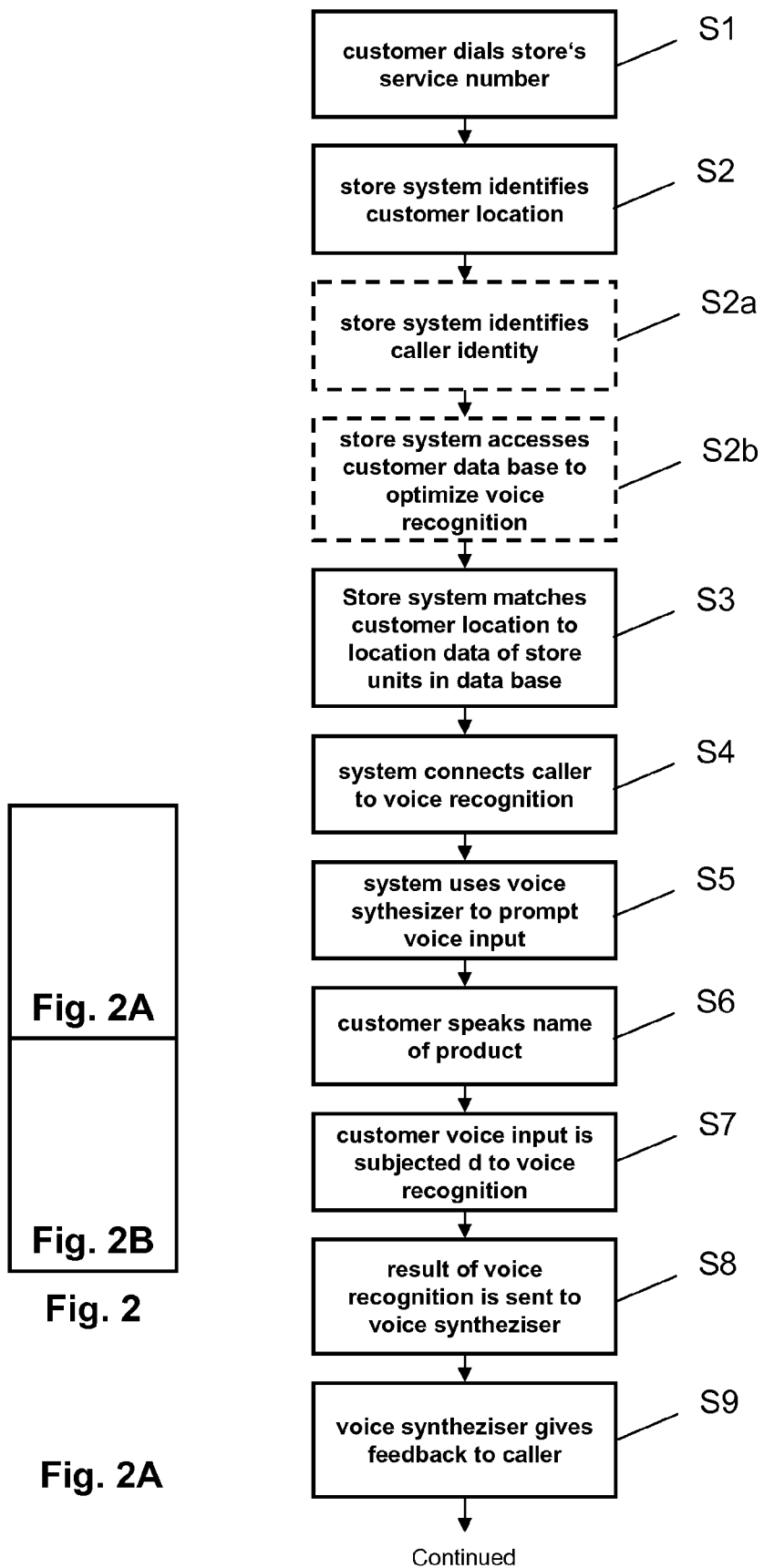

SYSTEM AND METHOD FOR OBTAINING MERCHANDISE INFORMATION

BACKGROUND OF THE INVENTION

The various embodiments described herein generally relate to retail-customer assistance systems. More particularly, the various embodiments described herein relate to a system and method for assisting a retail customer to obtain information about merchandise.

In modern retailing, the trend is increasingly toward high-volume outlets that contain literally tens of thousands of items and are staffed by the fewest possible personnel. To keep prices at a competitive level retail stores strive to cut frills, pack merchandise in a maximal way onto shelves and keep number and training of personnel low. This model for lean staffing is further accentuated by having many of the "people-on-the-floor" that are doing shelf replenishment be representatives from suppliers rather than store personnel who are familiar with the store and, hence, can help shoppers. The above staff-to-customer ratio deficiency is additionally accentuated by 24/7 store hours where staffing during non-peak shopping hours is purposely kept to the absolute minimum.

In such a cost conscious retail environment, where thousands of items are up for sale in massive areas with shelved products and very few trained sales staff is available, the customer tends to pay lower prices while consistently having to manage the challenge of finding the location of desired merchandise on the shelves. Hence, finding merchandise tends to be time consuming and prone to causing customer frustration.

Retail stores have attempted to address the problem of helping customers find what they want in several different ways. Large chains, particularly grocery store chains, try to keep store layouts consistent amongst stores. However, layout consistency may not be strictly implemented, for example, because of varying store sizes and architectural constraints, and is likely only of value to frequent-repeat customers who are looking for the same merchandise once again.

The most direct way of assisting customers is by stores training their staff to know the merchandise layout. Such staffing and training, however, is difficult to implement in sufficient numbers in view of the cost, and does not prevent mistakes by staff. Alternatively, stores can put up large signs at the entry to aisles with information on what products are to be found in the respective aisle. However, because the signs need to be readable at a relative distance, only a limited number of products or merchandise categories can be listed on such placards. Detailed store directories can be printed but they lack ease of use for a browsing customer in the aisles and generate substantial expenses whenever a change in layout is made.

Further, automated kiosks installed in stores allow a customer to walk-up and query the store's product database for an item's shelf location. However, ease of use may be limited because the customer does not know the proper name of the product or lacks the required spelling/keying skills to be comfortable using it. Also, stationary kiosks, like printed directories, do not help browsing customers in the aisles or those making multiple purchases.

U.S. Pat. No. 6,928,343 describes a mobile kiosk attached to a shopping cart, wherein the shopping cart is augmented with the capability to continuously update the location of the shopper via a form of inertial positioning using compass bearing and wheel revolutions. Accordingly, the cart's kiosk advises the shopper of certain specials in the adjacent shelves. The location of the shopping chart is updated and refined whenever the customer uses the mobile kiosk to scan merchandise for a price quote or nutrition information. The mobile kiosk further provides the retailer with information related to how shoppers transverse the aisles and product displays.

U.S. Patent Publication No. 2005/044011 addresses part of the shopping kiosk usability issues by adopting a nested graphical product search interface. Rather than display directly merchandise or require entry of specific merchandise by name, the disclosed system allows a customer to start from, e.g., a kitchen setting and allow the user to decompose items displayed into merchandise for which a map through the store is displayed. This process of navigating via a hierarchy of nested displayed images requires a user-accessible computer with a display facility. The map can show the shortest distance through the store leading to each item, or lead the customer to items in the most convenient order. Additionally the map can note other products and merchandising of interest.

U.S. Patent Publication No. 2006/0059049 improves on the above store navigation by using a portable data device wherein the user enters a task such as tiling, which the system interprets as one or more items and then creates a path that is graphically displayed to the customer on the screen of the portable data device as a tour relative to graphically displayed layout of the store or part there-off. The path is also used to cause other product related information to be prompted to the customer to stimulate additional purchases. The task can be entered before-hand or directly keyed into the personal digital assistant (PDA) using its alpha/numeric keyboard. The task is then decomposed into a number of constituent purchases of items. The path includes a graphical representation of the exact location of the sought item. The platform for display of the path is a personal computer, but can also be a web enabled mobile phone or PDA with the required display facilities. The path can be pre-stored or loaded into a portable device to be accessed during shopping or printed onto paper.

The technique of U.S. Patent Publication No. 2006/0059049 assumes prompting a shopper as the shopper transits the path outlined of the products associated with the task. For a usable path display a sufficient display size and resolution are required. Also all information is given relative to a path that may not be direct even when the customer's interest is focused on simply getting to the specific shelf location.

The above-described systems provide some assistance to customers. However, these systems require special purpose devices, e.g., with significant display capability, and, hence, a substantial initial financial investment. In addition, customers may not be familiar, or hesitant using these devices, for example, because they are not comfortable typing or feel distracted from shopping when typing. The mode of usage does not emulate and optimize the simplest mode of shopping which is inquiry to a knowledgeable party and walkup and purchase.

SUMMARY OF THE INVENTION

Therefore, a need exists for an improved system and method for locating desired products in retail and wholesale stores as well as warehouses or malls. Accordingly, the various embodiments described herein are based on communication devices, such as mobile phones, conventional landline telephones, and telephony enabled PDAs/smart phones, with utilization in the manner consumers are already familiar and comfortable with, and consistent with not interfering or distracting from the overall shopping experience.

One aspect of the invention involves a method of obtaining merchandise information from a store system using speech processing technology to determine a spoken query entry, and to generate synthetic or pre-stored speech for response. The method includes receiving via a communication network an information inquiry from a customer regarding a particular product. The location of the customer is determined, which is then used to determine a store closest to the customer. A merchandise database is searched for the inquired information regarding the particular product, wherein searching the merchandise database is limited to products available at the store closest to the customer location. The inquired information is retrieved from the merchandise database, and transmitted to the customer.

Another aspect involves a system for obtaining merchandise information. The system includes a store system coupled to a communication network to receive an information inquiry from a customer regarding a particular product. The store system includes means for performing the method of obtaining merchandise information.

In one embodiment, the location of the customer relative to a specific store in a chain is determined via the telephony network (for example, determining the base station or cell tower the customer's phone is using). Reducing the product set to that available at the determined store enhances the accuracy of the product query when the customer's information inquiry is subjected to a speech recognition process. Accordingly, the store database is then particularized so that in one embodiment the product query results are used to determine the precise location of the merchandise in that store specified via branch, aisle and shelf, or any other method convenient to the store architecture and design.

Particularization of the speech recognition process to a given store's database of merchandise occurs in one embodiment via local WiFi or GPS technology associated with mobile telephony.

Another embodiment involves performing the speech recognition against a global database containing all related merchandise, and then delimiting the speech recognition results by the specific merchandise available in the store determined by telephony means.

The customer may enter a merchandise query in freeform, i.e., the specific product name and or type of merchandise is spoken with no defined hierarchy, or the system prompts the customer, for example, for category of merchandise and then for any specific brand. If the brand is temporarily not available in the store, the query for the location of this category of merchandise is responded with available alternative brands.

The customer is able to reject the assumed speech recognition choice and re-voice the query. The system can use the results of both queries to maximize the successful interpretation of the follow-up voicing. If the customer accepts the re-voiced speech recognition result, the speech recognition system uses the correction to enhance the customer's speech recognition training profile. The training profile is otherwise optionally generated by the user repeating back a set of specific words as audio or character prompted by the system.

In one embodiment, the customer dials a single access number related to the chain of stores, and via cellular tower inference the specific store and, hence, shopper location is ascertained seamless to the customer dial-in. The inquiry is by the customer speaking into a mobile phone. The system applies speech recognition technology to decipher the inquiry. The merchandise database is automatically restricted to a subset of the "universe" of items to those carried by that store and further enhances the relevance of speech recognition processing in resolving the customer's utterance as a specific item in the store's merchandise. Accordingly, the speech recognition result is then looked up in the related store's merchandise database resulting in a specific, precise, aisle/shelf location for the requested merchandise being communicated back to the customer via synthetic or pre-stored speech. Alternatively, the aisle/shelf location is communicated to the customer as an image (or a sequence of images) or character data displayed on the customer's mobile phone display.

For example, if the product is not in stock at the branch where the customer is currently situated, alternative branches are provided within a preset range. Directions to the alternative branch may be provided if the customer so desires by means of existing mapping software.

The related database is resolved for purposes of speech recognition accuracy by means of proximity data obtained via telephony means, for example, including a caller's phone number (caller id). The user can be advised of the branch inferred from that data and, if required, over-ride that information by means of the system's speech recognition technology.

Another aspect of this invention utilizes the specific localization of the customer relative to a given store in a chain to enhance the facilities of SMS keying to converge to the merchandise being phone pad entered with response via audio or characters displayed on the telephony device. The response to a query is usually the specific aisle and shelf where the item can be found and can be communicated in return to the customer on their mobile phone via synthetic or pre-stored speech. In one embodiment, this concise information can be displayed via any standard telephone device display as character data.

According to one embodiment, a mobile phone, or any telephony/wireless data service or GPS enabled telephony device can be used to assist a customer, or store staff, to find the precise location of merchandise in large retail and wholesale, or in other establishments including warehouses. Shoppers can use these devices to enter by speech recognition processing or keying (SMS) the merchandise in question in a simple mode without necessitating a standard (QWERTY etc.) keyboard. In response to this entry, the system advises the customer of the merchandise aisle/shelf location by audio feedback or pre-stored speech and/or by character data on the telephone's display. The customer is thereby prompted to find the item in question or an entire list of items. The latter would reflect multiple successive merchandise location inquires and will be organized in an optimal shopping tour to avoid backtracking/minimize shopping time. Key for immediacy and ease of use is the ability to affect merchandise location in any store or any store in a chain by dialing a single nationwide number, using a store's WiFi technology, or telephony integrated GPS equipment, and all further resolution of location, store specific database, user preference are done automatically with no overt user interaction.

In one embodiment, the customer is not required to enter any personal identification since the customer is further identified to the system for purposes of access of prior stored speech recognition training profiles and other information by means of an assigned caller identification. Advantageously, triangulation precision to affect shopper location within the store is not required.

Alternatively, if a customer is calling, for example, from a home phone the transmitted phone number of the caller (caller ID) allows the store system to identify the caller's location and, then, to determine the store located closest to the caller. The caller may be asked to confirm his location, or to defer to another store location entered by speech or SMS. An additional alternative allows the customer to enter by speech or phone keypad the customer's post/ZIP code, or by voicing the location or name of the store the customer wants to visit.

Alternatively, the customer can enunciate (or include in the SMS) a branch number posted in the store, or entering by speech or SMS the geographic location.

Advantageously, the immediate access via caller identification to a user's profile offers further enhancement to speech recognition and SMS entry by retaining those products previously shopped for that can be used to more reliably resolve speech recognition ambiguities and further increase the convergence of SMS entry. Such auxiliary lists can be resident on the store system or downloaded as a special application to the customer's mobile telephony device.

Whereas the merchandise location information is given to the customer via speech feedback and/or as characters (image) on the telephony screen that denotes aisle number, and a sector along the shelf or relative position in the aisle, in upscale department stores where aisles are not denoted as in grocery stores, the system can give detailed directions from a central point like the foot of the escalator. In the course of such merchandise location feedback to the customer, the customer can also be prompted with customer relationship data such as the queried product or related sales and promotional information.

Advantageously, the system and method assist shoppers in locating the desired purchases in large retail and wholesale mega-marts by themselves, even before actually entering the store, e.g., from home, from the car or the store's parking lot. Using their communication devices, shoppers can access a store database to locate any specific merchandise and find precise aisle/shelf location without recourse to a standalone kiosk or using conventional keyboarding. The system and method make access to the store database a simple and familiar telephony task without any special menu or identification codes. Further, the system and method provide a seamless means to reach store staff if automatic speech recognition or SMS database query fail. The result of store employee help in terms of a specific product can be reviewed against the customer's query to further train the speech recognition system.

An additional advantage is that the search for multiple shopping items entered by speech recognition or SMS or previously entered remote from the store and now updated speech recognition to reflected one or more disparate items that occur to the customer in the course of shopping. The new items are combined into a list with previously queried items so that the customer can be directed from aisle/shelf location to aisle/shelf location in an optimal order that avoids backtracking wherever possible and hence minimizes shopping time.

Utilization of the method and system can be "spur of the moment" or for a single purchase that occurs to the shopper in the course of regular shopping as well as giving the shopper a list ordered to avoid back tracking. In following the analogy of customer walkup to a knowledgeable person and inquiring about precise aisle/shelf location, the customer location and shopping needs to be identified relative to a merchandise and aisle/shelf location without requiring the customer to identify the precise store. Hence, following the analogy of walk-up and inquire, customers will be much more likely to use the invention when new applications such as obtaining product information from a particular store are available.

The invention also lends itself to improving the relevance of the selection of merchandise on the shopped store's shelves by either recording the audio or keystrokes of those products queried by the customer not found in the stores database. The audio can be resolved to phoneme strings that in turn can be clustered or sorted as if alphabetical data so like product inquiries not found in the store database can be resolved by listening to just a few audio samples rather than an exhaustive review. The store staff can review these product queries not found in the store's database and thereby get early feedback on customer requested brands and merchandise that could be added to the inventory. Also, the current database content can be enhanced to reflect queries that did not match the database because of anomalies in spelling or customer references that are generic and in common use but not reflected in catalog names, such as requests for "nylon stockings" when standard trade terminology might be "hosiery".

In the regard of using the invention to improve the inventory of the store being shopped a two tier database query structure can be adopted whereby, when a speech recognition or SMS query fails to match the store database, it defaults to a global product database containing a wider selection of brand and product names as well as any supplementary data necessary to resolve a wide variety of customer requests. A match in that global database allows for response to the shopper via synthetic or pre-stored speech or character display on the shopper's telephony device of information such as: "The requested product is not carried in this store but our selection of such merchandise can be found on Aisle X Section B." The list of such global database matches not found in the shopped store can then be reviewed toward the same objective as discussed above of adding merchandise to the shopped store based on assessment of requested merchandise not found.

It is contemplated that the invention applies to applications where an inquiry is first matched against a global merchandise database for the purpose of speech recognition. The result of this recognition process can then be matched against the merchandise database of the shop identified via the preciously described caller localization for retrieval of merchandise information such as location within the store.

Further, the processing infrastructure of the store system can be used to also create and update the store's aisle-by-aisle, shelf-by-shelf merchandise database that is accessed via shopper queries. In a store merchandise aisle/shelf database creation mode, an operator proceeds to voice his location in the store (e.g., Aisle 7, Section D, Top $3^{rd}$ Shelf from bottom) by speech recognition and proceeds with an UPC bar code reader or EPC RFID reader to record/identify all merchandise in that location. The same process extends to restocking or adding new products. Alternatively, bar coded or RFID labels on the shelves etc. throughout the establishment can be scanned to give the exact store location instead of the above voice entry that is subject to speech recognition as shelved merchandise is recorded in the store merchandise database per the above process.

This aspect of the invention involves a method of generating a merchandise database used in a system for obtaining merchandise information. A request for entering information to the merchandise database is received via a communication network from an operator having a telephony device. The operator is requested to speak a current operator location with respect to at least one of an aisle and shelf in a store. The operator is then requested to enter at least one of a predetermined product indicium and name of a product at the current operator location. Data representing the current operator location and data representing the product indicium is stored as a data set in the merchandise data base. Advantageously, the product indicium is a bar code (UPC/EPC) widely used for identifying products.

BRIEF DESCRIPTION OF THE SEVERAL VIEWS OF THE DRAWINGS

The novel features and method steps characteristic of the invention are set out in the claims below. The invention itself, however, as well as other features and advantages thereof, are best understood by reference to the detailed description, which follows, when read in conjunction with the accompanying drawings, wherein:

DETAILED DESCRIPTION OF THE INVENTION

Figure 1:
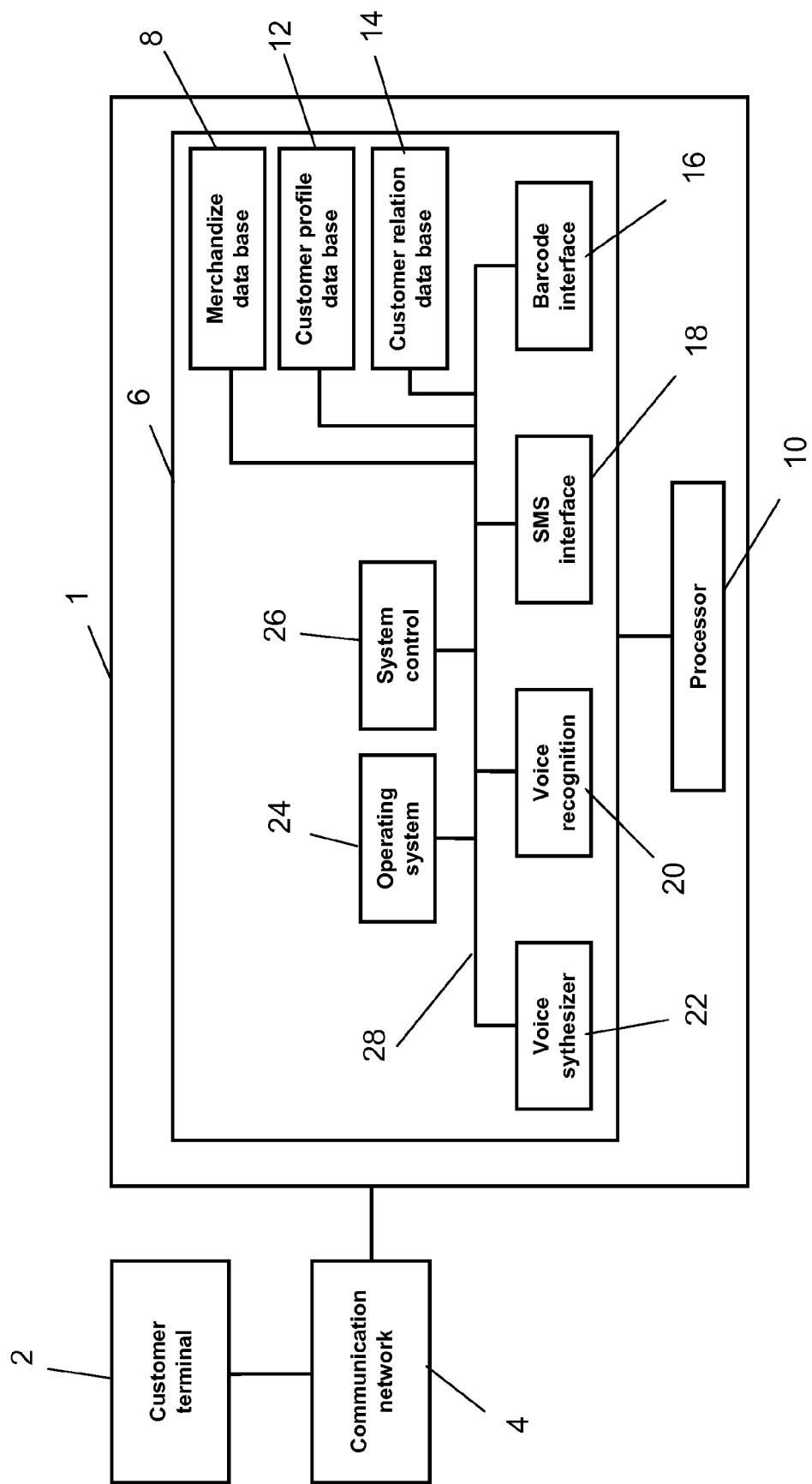
FIG. 1 shows a schematic block diagram of one embodiment of a system for obtaining information about merchandise.

FIG. 1 illustrates an overview of one embodiment of a system 1 for obtaining merchandise information coupled to a communication network 4. At least one customer terminal 2 is coupled to the communication network 4 to enable a customer access to the system 1. The customer terminal 2 may be a telephone at the customer's residence (fixed line, plain old telephone), a mobile phone, a telephony enabled personal digital assistant (PDA), or any other device for speech and/or data communication via the communication network 4. The customer terminal 2 may further be provided with a GPS functionality. Accordingly, the communication network 4 provides for such communication, for example, via a public phone system (fixed and/or mobile), a WiFi network, the Internet (e.g., using VoIP), or a combination of a phone system and the Internet.

A company that operates at least one of a retail, department, wholesale, or grocery store, or any other store or warehouse etc., maintains and operates the system 1 or alternatively the entire system and database can be outsourced to a third party. The system is configured to receive an information inquiry from the customer regarding a product the customer intends to purchase, or is interested in for some other reason. In one embodiment, the customer requests information about where the product is located in the company's store the customer wants to buy that product. In response to the customer's request, the system 1 searches a merchandise database of that store, retrieves the product location information and informs the customer where the product can be found in that store, e.g., by providing aisle and shelf information, alone or in combination with other information, such as in frozen food section, next to cashier #1. Knowing, for example, the aisle and shelf, for example, before the customer even enters the store, enables the customer to find the product in that store faster, without wandering around in the store searching for the product.

In the following description of one embodiment, the system 1 is configured to assist the customer locating a product in a store. Accordingly, the system 1 may be referred to as merchandise locating system 1. However, it is contemplated that locating a product in a store is one exemplary application of the system 1; other applications include obtaining product specifications/information, specials and promotions related to a given type of merchandise.

In the embodiment of FIG. 1, the merchandise locating system 1 includes hardware and software that provide for the functionalities of a system control 26, operating system 24, merchandise database 8, speech synthesizer 22, speech recognition 20, SMS interface 18, bar code/EPC interface 16, customer relation database 14, and customer profile database 12, which communicate via a bus system 28 under control of at least one processor 10. These functional units may reside in a memory 6 coupled to the processor 10.

For illustrative purposes, FIG. 1 depicts the system control 26, operating system 24, merchandise database 8, speech synthesizer 22, speech recognition 20, SMS interface 18, bar code/EPC interface 16, customer relation database 14, and customer profile database 12 as separate functional units. However, it is contemplated that in a particular implementation of the system, a different arrangement of these functional units may be chosen, or that one or more functional units may be combined into one unit, e.g., a speech processing unit instead of two separate units for speech synthesizer 22 and speech recognition 20.

In one embodiment, the store system 1 is based on a commercially available LINUX® or WINDOWS® based computer having one or more suitable processors from Intel Corp., or Advanced Micro Devices, Inc. The computer is configured to have the above-listed functional units, for example, by implementing interfaces and installing commercially available software to perform speech recognition and database management.

In one embodiment, a large national chain of stores can implement the store system 1 directly as an extension of its own IT operation, or an outsourced application to a telephony service provider or through third parties such as call centers. Where, as in the preferred embodiment, a mobile phone is used either to affect speech recognition or to send an electronic message (SMS) using the phone's keypad, the location of the retail outlet results from base station information or locational information that service providers can transfer to applications, similar to other applications such as services that allow registered parents to track their children via their mobile phones. The locational information thereby obtained is used to delineate a given stores merchandise, separate from that of the entire chain by either relational database means or by accessing discrete store databases.

The speech recognition or SMS application are based on standard processor architectures using conventional operating systems. Examples of known speech recognition software are VoCon® and NaturallySpeaking® available from Nuance Communications, Inc. that allow training that can be specialized via the user's profile, or can be used in untrained general user mode with adequate accuracy for application in the store system 1. It is envisaged that the speech recognition technology implemented in the store system 1 allows the customer to dialog with the directness as if dealing with a knowledgeable store staff. The need for multi-level menus that are viewed as a nuisance factors is obviated. Operator intervention is not required unless the speech recognition or SMS product entry fails to achieve a merchandise database match. The staff currently in communication with the customer can be store personnel wearing earpieces doing other tasks and just responding as if receiving a "phone call".

The customer can contact the store system 1 by a simple, suggestive toll-free number. Upon connection, in one embodiment, the customer is asked: "Please tell us what you are looking for." Traditional menu interfacing is consciously avoided with foreseeable extensions being limited to language preference, or if they wish to enter a single or multiple product request.

The processor 100 is configured to perform speech recognition either as a software application or as a dedicated hardware facility. In both regards, standard processors, or special purpose processors, may be used. The store system 1 runs under standard operating systems structured for real time multiprocessing response. The databases can be organized in a discrete store-by-store fashion, or as a chain-wide master relational database that is subtended upon receiving the phone tower or other locational information such as local WiFi, GPS. Speech recognition technology has reached a state-of-the-art where standard speech recognition applications can be used, preferably optimized in "Command" mode to handle short phrases rather than continuous speech.

The customer utterance is transferred to the speech recognition process of the store system 1 via telephony and in most instances as digitized speech that is directly input to the speech recognition process. The related databases are linked to the system's processors to increase the speed of response to the customer. Where ambiguous results occur from the speech recognition, the store system 1 can dialog with the shopper to ask to choose between options. Customer feedback results in the requested product location information, but also can be used to improve recognition reliability for the customer.

In one scenario, the customer uses the customer terminal 2, for example, a mobile telephony device equipped with a microphone, a speaker, a display and a keypad to connect to the store system 1. As known in the art of mobile radio communication, the mobile phone connects to the communication network 4 via a base station assigned to handle the traffic in a certain area assigned to that base station. In the service provider's network infrastructure, the location of each base station is known. Hence, knowing the base station used to access the communication network 4, allows deducting the location of the customer making a call.

The base station information is used to advise the store system 1 as to which store the customer is closest to, or is calling from, so that subsequent speech recognition accuracy is optimized by restricting the merchandise database 8 to that store. That is, the merchandise of that store may differ from the merchandise of others, for example, it may have less merchandise due to smaller size, or have specialized merchandise sections, such as regional products, sporting equipment and gardening equipment. Speech recognition is facilitated when the pool of possible products is known. The store system 1 performs all queries and responses relevant to the store's merchandise layout.

The store system 1 may not be able to deduct the location the customer is closest to or calling from, for example, because the location of the base station is not provided by the service provider, or because the location information is ambiguous. In that case, the store system 1 may prompt the customer to add additional information, such as a store identification number displayed in the store, or at least one part of the address of the store (ZIP code, city, street name, house number).

It is contemplated that using the location of a base station is only one option to deduct the location of the customer. In other embodiments, the location of the user may be determined by means of a sign-on to a WiFi network using the customer terminal 2, a GPS functionality implemented in the customer terminal 2, or by means of triangulation to resolve the database to only those products in the store being shopped and thereby facilitate speech recognition accuracy and/or SMS convergence.

Although speech recognition may be usable without prior training, customization to the individual user and hence greater utility of the store system 1 can be affected by enabling a user to previously train the speech recognition facility to their pronunciation. When the customer dials the single nationwide number of the chain of stores, the customer's speech recognition training profile is identified and accessed by the caller's phone number (caller Id) or other caller specific signaling.

In one embodiment, a customer may want to register with the store system 1 to use the assisted merchandise information service a store offers. Part of the registration process may be a speech recognition training, storing the training results and assigning a caller identification code (e.g., the caller's phone number) to the customer. The training results and the caller identification code may be stored in the customer profile database 12. When the customer accesses the store system 1 to use the merchandise information service, the store system 1 identifies the customer via the caller identification code and accesses the customer's profile of the customer profile database 12. This further enhances speech recognition via the previously stored speech recognition training results.

The "local" merchandise database 8 of the store system 1 stores by category of merchandise, or specific merchandise name information such as the location of a product in the store in terms of shelf, aisle etc., or special location such as floor, north, south, or specific point by point directions from a central or easily located point. The former may be more used by a mass retailer while the latter may be more related to a department store. This does also include storage and retrieval of any other merchandise related information.

The "global" merchandise database 9 contains relevant information such as brand names etc. about a wider range of merchandise that is not limited to the selection available at a specific store. Since in some embodiments of this invention the speech recognition is performed for the sake of processing speed and accuracy by initially matching the speech input against a local store database 8 this would result in the system's inability to recognize speech input about any merchandise not available at this specific store. This would not allow for suggestions to the customer for alternative products or data mining on unfulfilled customer requests. Therefore, requests for which no match has been found in the database 8 can be transferred to database 9 for recognition. The results can then be used for further processing.

In an alternative embodiment, the customer reaches the store system 1 using a store local wireless facility. The customer is then able to connect to the store's own WiFi network and call the service using VoIP. By placing numerous base stations, the store can triangulate, e.g., via WiFi signal strength, the customer's location in the store. The store system's use of the WiFi facility is preferably related to PDA-based embodiments, or to future devices that have multiple channels allowing simultaneous telephony and WiFi connections. With WiFi triangulation in the store the audio feedback has the additional advantage that it can be customized further, such as: "You are now walking down on Aisle 2, the product you requested is 3 aisles to your left on Aisle 5".

The optional customer relationship database 14 contains any additional information the retailer might want to include in the message sent back to the customer such as information about special bargains or events.

The barcode interface 16 is part of the setup that allows for this system to be used for creating and updating the store aisle-to-aisle and shelf-to-shelf database. A staff member can use a stationary or hand held scanner to capture merchandise barcode information that is then processed by the barcode interface 16 to be stored in the database 8. The location information about aisle and shelf number can either be fed to the system by means of scanning barcodes attached to aisles and shelves, or alternatively it can be entered by a microphone for speech recognition 20.

Figure 2B:
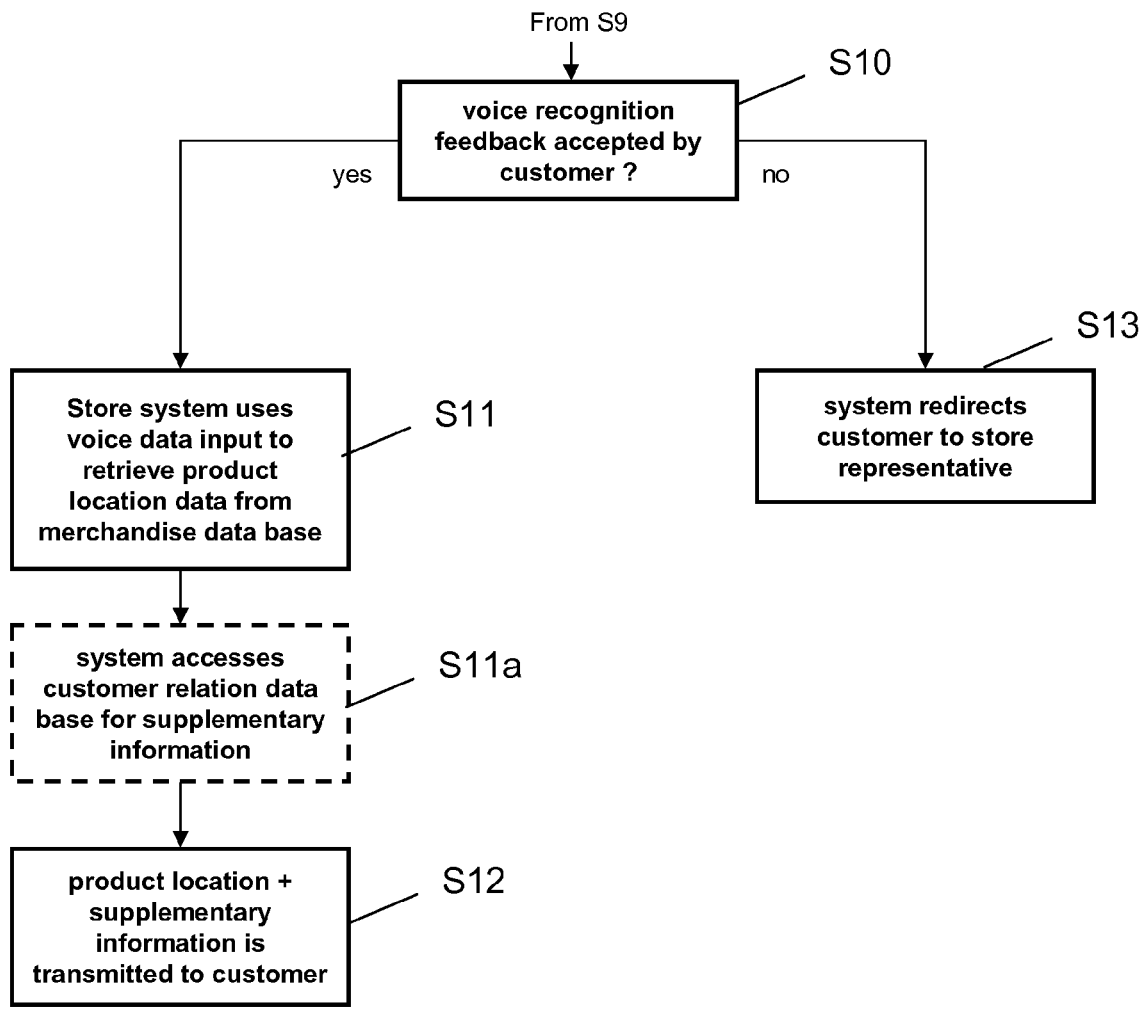
FIG. 2 is a flow diagram of one embodiment of a method of obtaining information about merchandise.

FIG. 2 depicts a flow diagram of one embodiment of a method of obtaining information about merchandise in the system illustrated in FIG. 1. In a step S1, a customer uses the customer terminal 2 to dial a store's service number. The store's service number may be displayed outside or inside the store.

In a step S2, the store system 1 identifies the location of the calling customer. In one embodiment, the identification of the location occurs via the location of a base station, as described above.

In one embodiment, the store system 1 optionally identifies the identity of the customer and accesses the customer profile database 12 to optimize speech recognition, as indicated in steps S2*a* and S2*b*. As steps S2*a*, S2*b* are optional, there are shown in FIG. 1 in dashed lines. The customer profile particularizes the store system 1 to the specific customer and the speech pattern developed by previous training, for example, during the registration process.

Proceeding to a step S3, the store system 1 matches the location of the calling customer to location data of store units in a database. That is, for large retail chains the relatively fine grid of cellular base stations allows making a one-for-one mapping. Upon identification of the store being shopped, the product database 8 is restricted to only those items carried and, hence speech recognition is enhanced in accuracy and/or SMS touchtone convergence is accelerated. The resulting database match is also then relevant to the specific merchandise aisle/shelf layout of the store being shopped.

Proceeding to a step S4, the store system 1 connects the customer to a speech recognition system. The customer's request is transferred as digitalized speech to the speech recognition procedure. In a circumstance where the telephony front-end provides analog transmission, step S4 performs the require A/D conversion. The speech recognition process is optimized for short, discrete utterances normally referred to in the art as Command Mode.

Proceeding to a step S5, the store system 1 uses the speech synthesizer or pre-stored speech to prompt speech input by the customer. The customer can enter the merchandise request stating the brand name or just what type of merchandise they want to buy, or the store system 1 can request the query to first state merchandise type, e.g., "Cereal", then the brand, e.g. Kellogg's Bran®.

Proceeding to a step S6, the customer speaks the name of the product.

Proceeding to a step S7, the customer's speech input is subjected to speech recognition. The system's speech recognizer 22 is optimized for recognizing speech received over the phone and may be trained to the customer's speech. The customer speaks the name of the product of interest into the microphone of the customer terminal 2, and the speech recognition system generates an interpretation of the spoken product name versus the data in the merchandise database 8. Proceeding to a step S8, the result of the speech recognition is fed to the speech synthesizer 22. The speech synthesizer 22 uses the interpretation of the spoken product name to generate a synthetic speech or retrieve a prerecorded speech segment (s).

Proceeding to a step S9, the speech synthesizer 22 gives a feedback to the customer. That is, the store system 1 advises the customer of its interpretation of the spoken product name.

Proceeding to a step S10, the store system 1 determines whether the customer accepts the speech recognition feedback. The customer either accepts or rejects the speech recognition's interpretation either by saying "yes" or striking a key (e.g., #) on the customer terminal's keypad, or a counter sequence for rejection. If the customer accepts the feedback as corresponding to the product name input by the customer, the method proceeds along the YES branch to a step S11.

In step S11, the store system 1 uses the speech input to retrieve the product location from the merchandise database 8. That is, if the customer accepts the speech recognition's interpretation, the store system 1 responds by accessing the merchandise database 8 to advise the customer by speech response of the location of the requested merchandise in that store. The location may be identified by an aisle number, and if the store so chooses to demarcate the aisle into marked sectors, a sector designator and/or shelf number (top, bottom, $2^{nd}$ etc.), right or left etc. If the aisles are not demarcated into sectors then a more general instruction like near the middle, left side may be given.

In one embodiment, the store system 1 sends a signal to the customer terminal 2 to cause the location of the product and/or the way to the location to be displayed on the customer terminal 2. Additionally the location instructions can be sent to the customer terminal 2 as a simple, concise text message. In upscale department stores where aisles are not denoted like in grocery stores, the system can give directions from a central point like the foot of the escalator.

In one embodiment, as indicated in a step S11*a*, the store system 1 accesses the customer relation database 14 for supplementary information.

In one embodiment as indicated in Step 11*b* unmatched customer requests are stored as audio in a database for future operator review to determine possible additions to the shopped store's merchandise. Special recognition tools that search for common phoneme strings or phases in the unfulfilled customer requests can aid in clustering any unfulfilled customer requests and facilitate operator review.

In one embodiment indicated in Step 11*c*, failure to match a customer's request causes the request to be attempted for match against a global database 9. The global database 9 is a chain-wide compendium, or a directory, of all relevant information necessary to achieve recognition, e.g., brand names, generic product names like "bread", "milk", but also aliases, such as item names with a regionally limited range of use, and also different spellings of the same name. A match against the global database 9 allows the store system 1 to respond with information where similar products can be found in the store, and to create for merchandise addition to the shopped store a list of products requested for possible addition to inventory.

Proceeding to a step S12, the store system 1 transmits the product location and any supplementary information determined in step S11*a* to the customer.

If in step S10 the customer does not accept the feedback because it does not correspond to the product name input by the customer, i.e., the system's voicing is not correct, the method proceeds along the NO branch to a step S13. In that case, the customer can retry and speak the product name again, or can be transferred to a store representative, as indicated in step S13, who is equipped with a headset or other unit to receiving/transmitting device to dialog directly with the customer and resolve the requested merchandise location. The store representative may be any of the staff doing sundry other tasks where contact is facilitated by their wearing, for example, wireless earpieces while doing their other assigned responsibilities. In one embodiment, the store representative provides the information so the customer's session is finished unless the customer requested a list mode in which as the store representative will speak or key location so it can be added to the optimized shopping tour.

In one embodiment, when the customer signs onto the store system 1, or during shopping, the customer can by speech or keypad put the store system 1 into a "shopping list" mode. In this mode, the customer speaks all items being shopped for, and the store system 1, after receiving the customer's confirmation of correct recognition, puts items into an order where the customer will be prompted with the location per the above example of each item in an order of precedence that will avoid any back-tracking—hence saving a key element of shopping time and frustration. The list mode of operation can also add to an existing customer shopping list already existing on the store system 1.

The disclosed invention allows for further improving the efficiency and accuracy of speech recognition and SMS entry by constraining a lookup specifically to a store's merchandise database or shelf layout thereby facilitating unambiguous identification via speech recognition or with the fewest keypad strokes.

In more detail, the customer indicates to the store system 1 via spoken utterance and/or via a keypad stroke whether the customer is looking for a specific store shelf location, e.g., "Breakfast Cereal" or a specific product, e.g., "Kellogg's Bran®". A keypad entry can be used with speech recognition where very specific information is required once the general category of information has been determined by speech, or where a shopping list has been pre-stored on the phone and speech is used for a few impulse or last minute additions. By use of the pre-knowledge the store system's database 8 can be delimited to increase the speech recognition accuracy and SMS efficiency.

Advantageously, the store may create and update the merchandise database 8 on its own. For example, to create the merchandise database 8 a store employee equipped with a headset and a barcode reader may process the merchandise per aisle and shelf. While the employee stands in front of a shelf, the employee speaks the current location—e.g., aisle 8, sector A and receives a speech recognizer response. Once confirmed the employee can begin to record via the bar code reader the merchandise therein. Additional details like shelf can be spoken as the process continues. This procedure may be performed via barcode reading only where the aisles and the shelves are equipped with barcodes and the operator scans them at the beginning of the aisle and prior to switching shelves. The employee continues through the merchandise and speaks changes in aisle/sector etc. as they are encountered. In case new products need to be added to the merchandise database 8, the locations of these products may be directly entered at a central station. In the alternative, the locations of the new products may be entered in the above-described manner using speech and a bar code scanner by means of an employee when shelving the new products. For purposes of the above process bar code and RFID are viewed as equivalent.

It is apparent that there has been disclosed a system and method for obtaining merchandise information that fully satisfies the objects, means, and advantages set forth herein before. For example, any mobile phone or telephony enabled PDA device can be used to assist a customer (or store staff) to find the precise location of merchandise in large retail and wholesale establishments. In particular, the disclosed method allows any mobile phone or telephony enabled PDA to be used to enter the merchandise in question in a hands-free mode without recourse to a keyboard and navigate the customer to find the item in question or an entire list of items organized in an optimal shopping tour without recourse to a display. Key for immediacy and ease of use is the ability to affect merchandise location in any store or any store in a chain by dialing a single nationwide number and all further resolution of location, store specific database is done automatically with no overt user interaction.

The merchandise in question is communicated for store database lookup using speech recognition or a single handed SMS keying where the specific store database of products and shelf location is determined from the "universe" of possibilities via identification of the base station being accessed, local WiFi or other triangulation or GPS means. The user is not required to enter any store or personal identification protocol since the user is further identified to the system for purposes of access of prior stored speech recognition training profiles and other information by use of "Caller Id:" It is contemplated that the process can begin before the customer even enters the store.

The immediate access to a user profile also offers further potential enhancement to speech recognition and SMS entry by retaining those products previously shopped for that can be used to resolve speech recognition ambiguities and increase the convergence of SMS entry. Such auxiliary lists can be resident on the central system or down loaded as a special application to the customer's mobile telephony device. Furthermore speech recognition precision can be continually improved for example when a second attempt at speech recognitions resolves the query, the erroneous first result versus the correct result can be used for tuning. Similarly successful speech recognition of the utterance of the store representative can be used also in the customer profile tuning process.

Further applications driven by Caller Id and base station location information allow for the customer to remotely enter a shopping list by speech, SMS or computer upload. The store system 1 realizes it is not in that store location and hence prepares to resolve a shopping list and store as part of the caller ID accessed user profile. Upon accessing the store system in that store location, for example, as resolved by cellular tower or caller ID retrieval of the customer's profile, the pre-stored shopping list is prompted to the shopper—if they wish to shop with it. If so, or as augmented with further shopping items, the list having store shelve locations is sequentially fed back to the customer in an order that the items can be shopped with no re-tracing of steps, or back-tracking, thereby saving significant shopping time.

The disclosure also allows the customer when entering the merchandise being location requested to use simple SMS format of data entry with full facilitates of partial word or phrase identification with the added value that lookup can be customized to the store's merchandise by product name or general category of merchandise to minimize keystrokes. Further, the method and system, if speech recognition fails, seamlessly transfer the customer to a store staff member who can dialog with the customer and advise them of item location. For any product identified via speech or SMS the customer can request also by speech or single dial pad keystroke to receive related audio feedback on specials, sales items etc.

The invention disclosed couples a mobile phone or telephony enabled PDA to dialog with a store merchandise database in a manner that is consistent with ease-of-use established for mobile phones that does not distract from the shopping objectives and provides a mode of customer query and feedback independent of keyboard or display.

What is claimed is:

1. A method of obtaining merchandise information from a merchandise locating digital processing system for a store, comprising:
   receiving into the merchandise locating digital processing system via a communication network a spoken information inquiry from a customer regarding a location of a particular product in the store;
   using speech recognition technology within the merchandise locating digital processing system to recognize the content of the spoken information inquiry from the customer;

processing information received via the communication network to determine a location of the customer;

using the customer location to determine a location of a branch of the store closest to the customer;

searching for the inquired information regarding the particular product in a merchandise database within the merchandise locating digital processing system by initially comparing the spoken information inquiry from the customer only to products within the merchandise database that are available at the branch of the store closest to the customer location to thereby enhance the accuracy of recognizing the content of the spoken information inquiry from the customer;

retrieving the inquired information from the merchandise database based on the content of the information inquiry recognized by the merchandise locating digital processing system, the retrieved information including whether the particular product is available at the branch of the store and including a physical location of the product within the branch of the store when the product is available; and transmitting the inquired information from the merchandise locating digital processing system to the customer via the communication network to inform the customer whether the particular product is available at the branch of the store and to inform the customer where the particular product is physically located within the branch of the store when the product is available.

2. The method of claim 1, wherein receiving the information inquiry includes receiving at the store merchandise locating digital processing system a telephone call from the customer speaking the information inquiry.

3. The method of claim 2, wherein determining the location of the customer includes processing at least one of a telephone number assigned to the customer, a location of a base station of a mobile phone system, a post code and a store identification data.

4. The method of claim 1, further comprising generating a synthesized announcement by the merchandise locating digital processing system based on a speech recognition result, and sending the announcement to the customer via the communication network.

5. The method of claim 4, further comprising prompting the customer to confirm whether the synthesized announcement corresponds to the spoken information inquiry.

6. The method of claim 5, further comprising selectively redirecting the information inquiry to a staff member when the customer does not confirm that the synthesized announcement corresponds to the spoken information inquiry.

7. The method of claim 1, wherein transmitting the inquired information to the customer from the merchandise locating digital processing system includes sending at least one of a text message, an audio message and an image to the customer via the communication network.

8. The method of claim 1, wherein receiving the information inquiry includes receiving at the store merchandise locating digital processing system an electronic message generated by the customer using a telephone keypad.

9. A system for obtaining merchandise information, comprising a store system coupled to a communication network to receive an information inquiry from a customer regarding a particular product, wherein the store system comprises:

means for receiving via a communication network a spoken information inquiry from a customer regarding a location of a particular product in a store;

means for processing information received via the communication network to determine a location of the customer;

means for using the customer location to determine a location of the store closest to the customer;

means for recognizing speech to recognize the spoken information inquiry from the customer;

means for searching a merchandise database for the inquired information regarding the particular product based on the recognized spoken information inquiry from the customer, the means for searching initially comparing the spoken information inquiry from the customer only to products within the merchandise database that are available at the branch of the store closest to the customer location to thereby enhance the accuracy of recognizing the spoken information inquiry from the customer;

means for retrieving the inquired information from the merchandise database based on the content of the recognized information inquiry, the retrieved information including whether the particular product is available at the branch of the store and including the physical location of the product within the branch of the store when the product is available; and means for transmitting the inquired information to the customer via the communication network to inform the customer whether the particular product is available at the branch of the store and to inform the customer where the particular product is physically located within the branch of the store when the product is available.

10. The system of claim 9, wherein the means for determining the location of the customer are configured to process at least one of a telephone number assigned to the customer, a location of a base station of a mobile phone system, a post code and a store identification data.

11. The system of claim 9, further comprising means for generating a synthesized announcement based on a speech recognition result, and means for sending the announcement to the customer via the communication network.

12. The system of claim 11, further comprising means for prompting the customer to confirm whether the synthesized announcement corresponds to the spoken information inquiry.

13. The system of claim 12, further comprising means for selectively redirecting the information inquiry to a customer representative when the customer does not confirm that the synthesized announcement corresponds to the spoken information inquiry.

14. The system of claim 9, wherein the means for transmitting the inquired information to the customer are configured to send at least one of a text message, an audio message and an image to the customer via the communication network.

15. The system of claim 9, further comprising means for processing an electronic message generated by customer using a telephone keypad.

* * * * *